United States Patent
Bai et al.

(10) Patent No.: US 12,170,057 B2
(45) Date of Patent: Dec. 17, 2024

(54) LIGHT-EMITTING CIRCUIT AND DISPLAY PANEL

(71) Applicant: Shenzhen China Star Optoelectronics Semiconductor Display Technology Co., Ltd., Guangdong (CN)

(72) Inventors: Yamei Bai, Guangdong (CN); Tianhong Wang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/542,703

(22) Filed: Dec. 17, 2023

(65) Prior Publication Data

US 2024/0221626 A1    Jul. 4, 2024

(30) Foreign Application Priority Data

Dec. 29, 2022    (CN) .......................... 202211711220.6

(51) Int. Cl.
G09G 3/32        (2016.01)
*G09G 3/3208*    (2016.01)
*G09G 3/3233*    (2016.01)

(52) U.S. Cl.
CPC ............. *G09G 3/32* (2013.01); *G09G 3/3208* (2013.01); *G09G 3/3233* (2013.01); *G09G 2300/0426* (2013.01); *G09G 2300/0842* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 2006/0066528 A1* | 3/2006 | Hara | G09G 3/325 345/76 |
| 2010/0001983 A1* | 1/2010 | Abe | G09G 3/3233 345/76 |
| 2019/0073953 A1* | 3/2019 | Kuang | G09G 3/3233 |
| 2020/0211463 A1* | 7/2020 | Yue | G09G 3/3258 |
| 2022/0189397 A1* | 6/2022 | Cao | G09G 3/3233 |

* cited by examiner

*Primary Examiner* — Dorothy Harris
(74) *Attorney, Agent, or Firm* — Nathan & Associates; Menachem Nathan

(57) ABSTRACT

A light-emitting circuit includes a first transistor, a second transistor, a light-emitting element, a first switching circuit, a second switching circuit, a first capacitor, a current source, and a third switching circuit. The first switching circuit, the second switching circuit, and the third switching circuit are synchronously turned on or synchronously turned off. This not only controls the current flowing through the first switching circuit through the first capacitor, the second switching circuit and the current source to the third power line, and but also controls the current flowing through the third switching circuit, the second transistor through the first capacitor, the second switching circuit and the current source flow to the third power line. Since the current passes through the first transistor and the second transistor, the current flowing through the light-emitting element is reduced, improving adverse effects of parasitic capacitance and wire resistance to the two transistors.

18 Claims, 3 Drawing Sheets

LIGHT-EMITTING CIRCUIT AND DISPLAY PANEL

CROSS REFERENCE TO RELATED APPLICATIONS

This application claims the priority of Chinese Patent Application No. 202211711220.6, entitled "LIGHT-EMITTING CIRCUIT AND DISPLAY PANEL", filed on Dec. 29, 2022, the disclosure of which is incorporated herein by reference in its entirety.

FIELD OF THE DISCLOSURE

The present disclosure relates to the field of display technology, specifically relates to a light-emitting circuit and a display panel.

BACKGROUND

The driving modes of the light-emitting element of the self-illuminating display device comprise passive driving and active driving. The former has a simple structure and can effectively reduce manufacturing costs, but the high driving voltage makes it unsuitable for large size and high resolution display panels, which is different from the current development trend. The latter uses independent transistors to control each pixel, and each pixel can be continuously and independently driven to emit light.

In the case of changes or damage to the current characteristics of the driving transistor, current flows into the light-emitting device during the signal writing stage, resulting in increased power consumption, insufficient writing, and poor reliability.

SUMMARY

The present disclosure provides a light-emitting circuit and a display panel to alleviate the technical problem that the current will flow into the light-emitting element during the writing stage.

According a first aspect of the present disclosure, a light-emitting circuit includes a first transistor, a second transistor, a light-emitting element, a first switching circuit, a second switching circuit, a first capacitor, a current source, and a third switching circuit. The first transistor includes a first electrode electrically connected to a first power line, a gate, and a second electrode. The second transistor includes a first electrode electrically connected to the second electrode of the first transistor, a gate, and a second electrode. The light-emitting element includes a first terminal electrically connected to the second electrode of the second transistor, and a second terminal electrically connected to a second power line. The first switching circuit includes a first terminal electrically connected to a charging terminal, and a second terminal electrically connected to the gate of the first transistor, the gate of the second transistor, and the second electrode of the second transistor. The second switching circuit includes a first terminal and a second terminal. The first capacitor is electrically connected between the second terminal of the first switching circuit and the first terminal of the second switching circuit. The current source is electrically connected between the second terminal of the second switching circuit and a third power line. The third switching circuit includes a first terminal electrically connected to the first electrode of the first transistor, and a second terminal electrically connected to the second electrode of the first transistor. The first switching circuit, the second switching circuit, and the third switching circuit are synchronously turned on or synchronously turned off.

Optionally, when the light-emitting circuit operates in a writing stage, the first switching circuit, the second switching circuit, and the third switching circuit are synchronously turned on to control a current flowing through the first switching circuit, the first capacitor, the second switching circuit, and the current source to the third power line, and to control current flowing through the third switching circuit, the second transistor, the first capacitor, the second switching circuit, and the current source flow to the third power line.

Optionally, when the light-emitting circuit operates in a light-emitting stage, the first switching circuit, the second switching circuit, and the third switching circuit are synchronously turned off to control current flowing through the first transistor and the second transistor to the second power line through the light-emitting element.

Optionally, the light-emitting circuit further comprises a first compensation circuit and a second compensation circuit. The first compensation circuit is electrically connected to the gate of the first transistor to reduce a threshold voltage drift of the first transistor. The second compensation circuit is electrically connected to the gate of the second transistor to reduce a threshold voltage drift of the second transistor.

Optionally, the charging terminal is used to transmit data signals, and the light-emitting element is an organic light-emitting diode, a micro light-emitting diode, a mini light-emitting diode or a quantum dot light-emitting diode.

Optionally, the first power line is used to transmit a positive power supply signal, the second power line is used to transmit a first negative power supply signal, the third power line is used to transmit a second negative power supply signal.

Optionally, a potential of the second negative power supply signal is lower than a potential of the first negative power supply signal.

Optionally, the light-emitting circuit further comprises a switch control line connected to a control terminal of the first switching circuit, a control terminal of the second switching circuit, and a control terminal of the third switching circuit.

Optionally, the first switching circuit is a third transistor, the second switching circuit is a fourth transistor, and the third switching circuit is a fifth transistor. A first electrode of the third transistor is electrically connected to the charging terminal, a second electrode of the third transistor is electrically connected to the first capacitor, the second electrode of the second transistor, the gate of the first transistor and the gate of the second transistor, and a gate of the third transistor is electrically connected to the switch control line. A first electrode of the fourth transistor is electrically connected to the second terminal of the first capacitor, a second electrode of the fourth transistor is electrically connected to the first terminal of the current source, and a gate of the fourth transistor is electrically connected to the switch control line. A first electrode of the fifth transistor is electrically connected to the first electrode of the first transistor, a second electrode of the fifth transistor is electrically connected to the second electrode of the first transistor, and a gate of the fifth transistor is electrically connected to the switch control line.

According to a second aspect of the present disclosure, a display panel includes a light-emitting circuit. The light-emitting circuit includes a first transistor, a second transistor, a light-emitting element, a first switching circuit, a second switching circuit, a first capacitor, a current source, and a third switching circuit. The first transistor includes a first electrode electrically connected to a first power line, a gate, and a second electrode. The second transistor includes a first electrode electrically connected to the second electrode of the first transistor, a gate, and a second electrode. The light-emitting element includes a first terminal electrically connected to the second electrode of the second transistor, and a second terminal electrically connected to a second power line. The first switching circuit includes a first terminal electrically connected to a charging terminal, and a second terminal electrically connected to the gate of the first transistor, the gate of the second transistor, and the second electrode of the second transistor. The second switching circuit includes a first terminal and a second terminal. The first capacitor is electrically connected between the second terminal of the first switching circuit and the first terminal of the second switching circuit. The current source is electrically connected between the second terminal of the second switching circuit and a third power line. The third switching circuit includes a first terminal electrically connected to the first electrode of the first transistor, and a second terminal electrically connected to the second electrode of the first transistor. The first switching circuit, the second switching circuit, and the third switching circuit are synchronously turned on or synchronously turned off.

Optionally, when the light-emitting circuit operates in a writing stage, the first switching circuit, the second switching circuit, and the third switching circuit are synchronously turned on to control a current flowing through the first switching circuit, the first capacitor, the second switching circuit, and the current source to the third power line, and to control current flowing through the third switching circuit, the second transistor, the first capacitor, the second switching circuit, and the current source flow to the third power line.

Optionally, when the light-emitting circuit operates in a light-emitting stage, the first switching circuit, the second switching circuit, and the third switching circuit are synchronously turned off to control current flowing through the first transistor and the second transistor to the second power line through the light-emitting element.

Optionally, the light-emitting circuit further comprises a first compensation circuit and a second compensation circuit. The first compensation circuit is electrically connected to the gate of the first transistor to reduce a threshold voltage drift of the first transistor. The second compensation circuit is electrically connected to the gate of the second transistor to reduce a threshold voltage drift of the second transistor.

Optionally, the charging terminal is used to transmit data signals, and the light-emitting element is an organic light-emitting diode, a micro light-emitting diode, a mini light-emitting diode or a quantum dot light-emitting diode.

Optionally, the first power line is used to transmit a positive power supply signal, the second power line is used to transmit a first negative power supply signal, the third power line is used to transmit a second negative power supply signal.

Optionally, a potential of the second negative power supply signal is lower than a potential of the first negative power supply signal.

Optionally, the light-emitting circuit further comprises a switch control line connected to a control terminal of the first switching circuit, a control terminal of the second switching circuit, and a control terminal of the third switching circuit.

Optionally, the first switching circuit is a third transistor, the second switching circuit is a fourth transistor, and the third switching circuit is a fifth transistor. A first electrode of the third transistor is electrically connected to the charging terminal, a second electrode of the third transistor is electrically connected to the first capacitor, the second electrode of the second transistor, the gate of the first transistor and the gate of the second transistor, and a gate of the third transistor is electrically connected to the switch control line. A first electrode of the fourth transistor is electrically connected to the second terminal of the first capacitor, a second electrode of the fourth transistor is electrically connected to the first terminal of the current source, and a gate of the fourth transistor is electrically connected to the switch control line. A first electrode of the fifth transistor is electrically connected to the first electrode of the first transistor, a second electrode of the fifth transistor is electrically connected to the second electrode of the first transistor, and a gate of the fifth transistor is electrically connected to the switch control line.

The display panel provided by the above embodiments of the present disclosure includes the light-emitting circuit. The first switching circuit, the second switching circuit and the third switching circuit can synchronously turn on in the writing stage, which not only controls the current flowing through the first switching circuit through the first capacitor, the second switching circuit and the current source to the third power line, and but also controls the current flowing through the third switching circuit, the second transistor through the first capacitor, the second switching circuit and the current source flow to the third power line. Therefore, the current cannot flow to the light-emitting element in the writing phase, reducing the power consumption without changing the potential transmitted by the first power line. By synchronously turning off the first switching circuit, the second switching circuit and the third switching circuit in the light-emitting stage, the current flowing through the first transistor and the second transistor can be controlled to the second power line through the light-emitting element. Since the current passes through the first transistor and the second transistor, the current flowing through the light-emitting element is reduced, improving the adverse effects of parasitic capacitance and wire resistance to the two transistors.

BRIEF DESCRIPTION OF THE DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF PREFERRED EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The following disclosure provides many different embodiments or examples to implement different structures of the present disclosure. In order to simplify the disclosure of the present disclosure, the components and settings of specific examples are described below. They are for example purposes only and are not intended to limit this application. Further, the present disclosure may repeat reference numbers and/or reference letters in different examples, such duplication is for the purpose of simplification and clarity, and does not by itself indicate the relationship between the various embodiments and/or settings discussed. Further, the present disclosure provides various examples of specific processes and materials, but those of ordinary skill in the art may be aware of the application of other processes and/or the use of other materials. The following are described in detail, it should be noted that the order of description of the following embodiments is not used as a qualification for the preferred order of embodiments.

Further, the terms "first", "second" are for descriptive purposes only, and cannot be understood as indicating or implying relative importance or implicitly indicating the number of technical features indicated, thereby limiting the features of "first", "second" may explicitly or implicitly include one or more of the features, in the description of the present invention, "plurality" means two or more, unless otherwise expressly and specifically limited.

Figure 1:
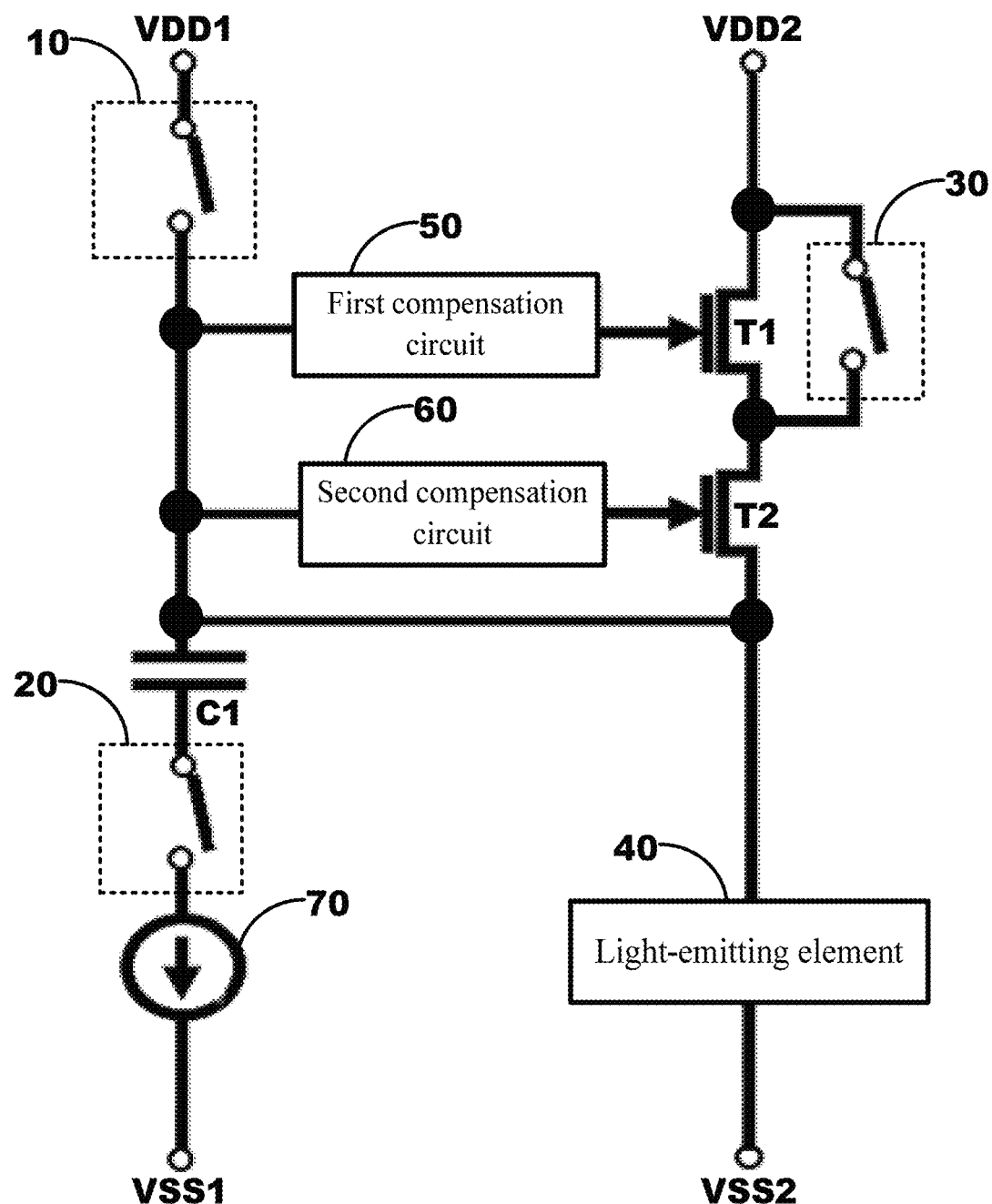
FIG. 1 is a circuit diagram of a light-emitting circuit according to an embodiment of the present disclosure.
Figure 2:
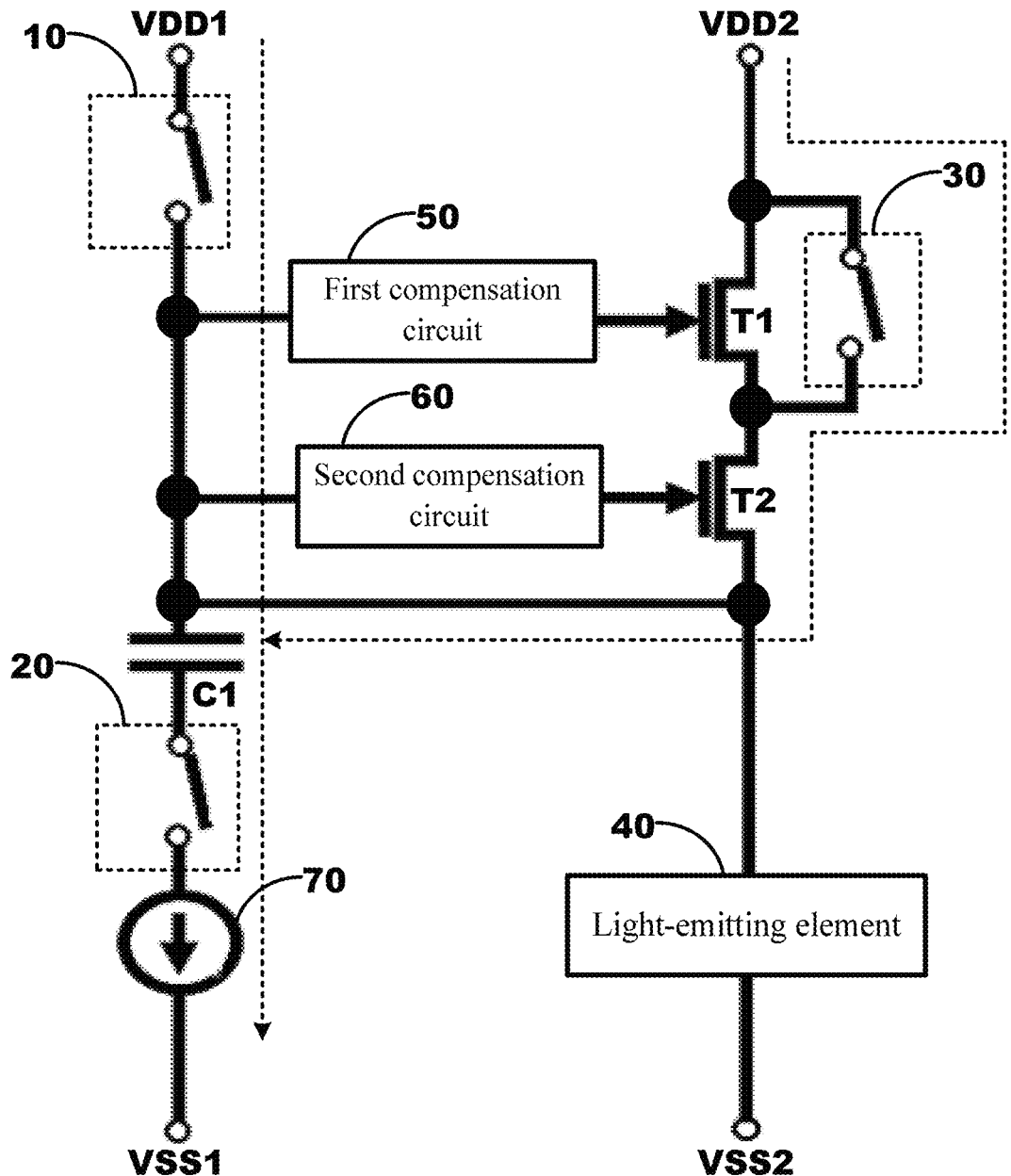
FIG. 2 illustrates a diagram of a first current direction of the light-emitting circuit provided according to an embodiment of the present disclosure.
Figure 3:
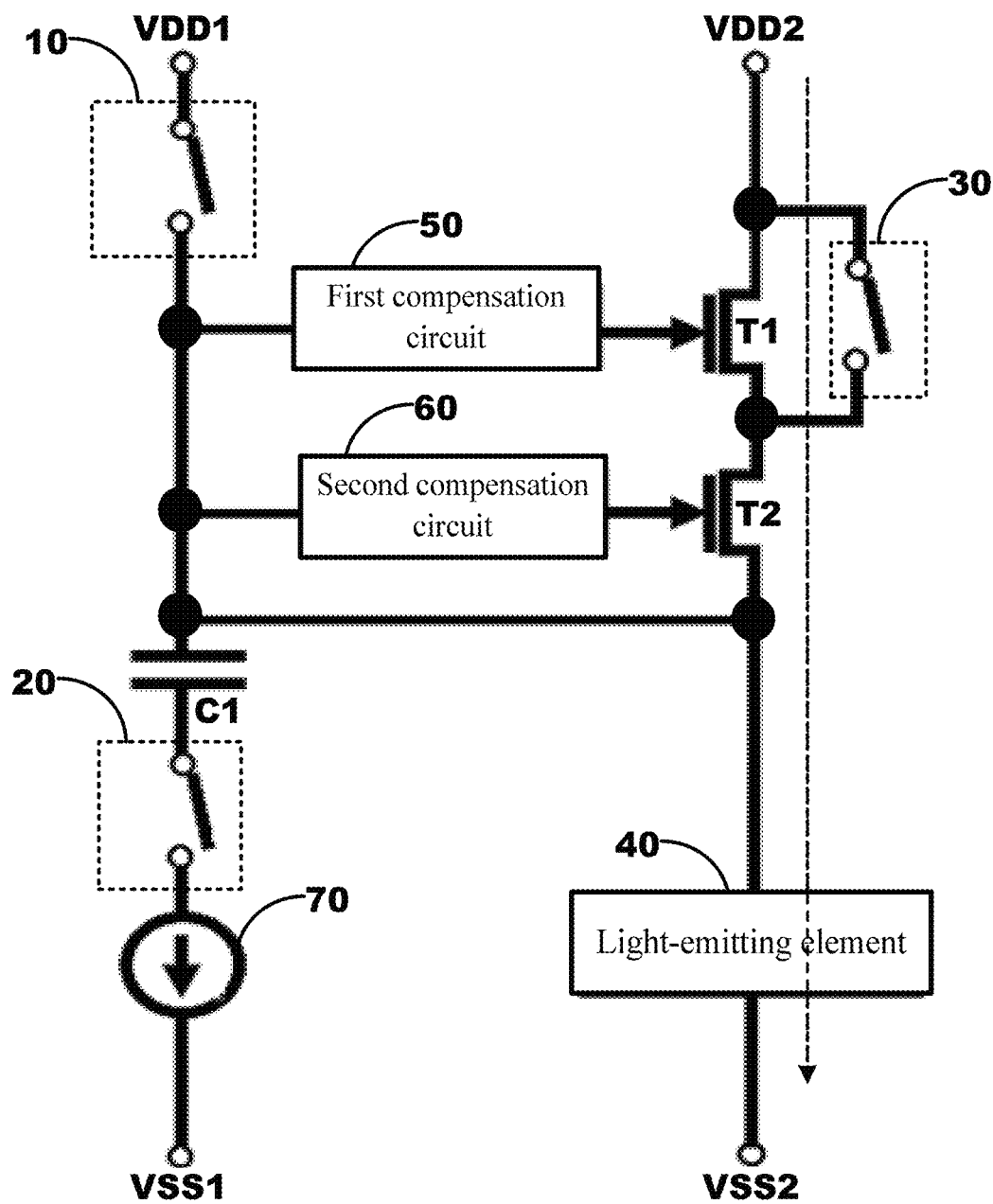
FIG. 3 illustrates a diagram of a second current direction of the light-emitting circuit provided according to an embodiment of the present disclosure.

Referring to FIGS. 1 to 3, an embodiment of the present disclosure provides a light-emitting circuit. As illustrated in FIG. 1, the light-emitting circuit includes a first transistor T1, a second transistor T2, a light-emitting element 40, a first switching circuit 10, a first capacitor C1, a second switching circuit 20, a current source 70, and a third switching circuit 30. The first electrode of the first transistor T1 is electrically connected to the first power line. The first electrode of the second transistor T2 is electrically connected to the second electrode of the first transistor T1. The first terminal of the light-emitting element 40 is electrically connected to the second electrode of the second transistor T2, and the second terminal of the light-emitting element 40 is electrically connected to the second power line. The first terminal of the first switching circuit 10 is electrically connected to the charging terminal. The second terminal of the first switching circuit 10 is electrically connected to the gate of the first transistor T1, the gate of the second transistor T2, and the second electrode of the second transistor T2. The first terminal of the first capacitor C1 is electrically connected to the second terminal of the first switching circuit 10. The first terminal of the second switching circuit 20 is electrically connected to the second terminal of the first capacitor C1. The first terminal of the current source 70 is electrically connected to the second terminal of the second switching circuit 20, and the second terminal of the current source 70 is electrically connected with the third power line. The first terminal of the third switching circuit 30 is electrically connected to the first electrode of the first transistor T1, and the second terminal of the third switching circuit 30 is electrically connected to the second electrode of the first transistor T1. The first switching circuit 10, the second switching circuit 20 and the third switching circuit 30 are synchronously turned on or synchronously turned off.

Because the first switching circuit 10, the second switching circuit 20 and the third switching circuit 30 are synchronously turned on in the writing stage, the light-emitting circuit controls the current flowing through the first switching circuit 10 to the third power line via the first capacitor C1, the second switching circuit 20 and the current source 70, and controls the current flowing through the third switching circuit 30 and the second transistor T2 to the third power line via the first capacitor C1, the second switching circuit 20 and the current source 70, thereby avoiding the current flowing to the light-emitting element 40 in the writing stage, and reducing power consumption without changing the potential transmitted by the first power line. Because the first switching circuit 10, the second switching circuit 20 and the third switching circuit 30 are synchronously turned off in the light-emitting stage, the current flowing through the first transistor T1, the second transistor T2 can be controlled through the light-emitting element 40 to the second power line. Since the current passes through the two channels of the first transistor T1 and the second transistor T2, the current flowing through the light-emitting element 40 is reduced, and the parasitic capacitance and wire resistance of the two transistors can be reduced.

The first electrode can be one of the source or drain, and the second electrode can be the other of the source or the drain. For example, when the first electrode is a source, the second electrode is a drain, or when the first electrode is a drain, the second electrode is a source.

The first transistor T1 is a thin film transistor with low leakage, which can more accurately control the current flowing through the light-emitting element 40, and then can control the luminous brightness of the light-emitting element 40 more stable. The second transistor T2 is a high-mobility thin-film transistor can control the current flow through the third switching circuit 30, the second transistor T2 more quickly flow to the first capacitor C1 in the writing stage.

In addition, the light-emitting circuit in the present embodiment can not only be applied to the display field of pixel circuits, backlight driving circuits, but also to the lighting field.

In one embodiment, as shown in FIG. 2, the light-emitting circuit in the writing phase, the first switching circuit 10, the second switching circuit 20 and the third switching circuit 30 are synchronously turned on to control the current flowing through the first switching circuit 10 to the third power line via the first capacitor C1, the second switching circuit 20, and the current source 70, and to control the current flowing through the third switching circuit 30 and the second transistor T2 to the third power line via the first capacitor C1, the second switching circuit 20, and the current source 70.

Because the current does not flow to the light-emitting element 40 during the writing phase, the power consumption can be reduced without changing the potential transmitted by the first power line.

In one embodiment, as shown in FIG. 3, the light-emitting circuit in the light-emitting stage, the first switching circuit 10, the second switching circuit 20, and the third switching circuit 30 synchronously turn off to control the current flowing through the first transistor T1 and the second transistor T2 to the second power line via the light-emitting element 40.

Since the current passes through the first transistor T1 and the second transistor T2, the current flowing through the light-emitting element 40 is reduced, improving the adverse effects of parasitic capacitance and wire resistance to the two transistors.

In one embodiment, the light-emitting circuit further comprises a first compensation circuit 50 and a second compensation circuit 60. The first compensation circuit 50 is electrically connected to the gate of the first transistor T1 to reduce the threshold voltage drift of the first transistor T1. The second compensation circuit 60 is electrically connected to the gate of the second transistor T2 to reduce the threshold voltage drift of the second transistor T2.

The First compensation circuit 50 and the second compensation circuit 60 can prevent the threshold voltage drift of the first transistor T1 and the second transistor T2, respectively, and can more accurately control the light-emitting element 40 flowing through the light-emitting element 40 to obtain the ideal brightness.

In another embodiment, the charging terminal is used to transmit data signals. The light-emitting element 40 are organic light-emitting diodes, micro-light-emitting diodes, mini light-emitting diodes or quantum dot light-emitting diodes.

When the light-emitting circuit applied in the display field is used as a pixel circuit or a backlight driving circuit, the charging terminal is connected to the data signal. In this application scenario, the charging terminal can also be connected to other power signals VDD1.

In one embodiment, the first power line is used to transmit the positive power signal VDD2, the second power line is used to transmit the first negative power supply signal VSS2, the third power line is used to transmit the second negative power supply signal VSS1. A potential of the second negative power supply signal VSS1 is lower than a potential of the first negative power supply signal VSS2.

Because the potential of the second negative power supply signal VSS1 is lower than the potential of the first negative power supply signal VSS2, the current flowing through the second transistor T2 can be easily conducted to the third power line in the writing stage, so that the current flowing through the second transistor T2 can be conducted to the light-emitting element 40.

In one embodiment, the second power line, the third power line is the same power line.

The second power line and the third power line are the same power line, which can reduce the number of transmission lines required for the light-emitting circuit.

In one embodiment, the light-emitting circuit further comprises a switching control line electrically connected to the control terminal of the first switching circuit 10, the control terminal of the second switching circuit 20, and the control terminal of the third switching circuit 30.

The control terminal of the first switching circuit 10, the control terminal of the second switching circuit 20, and the control terminal of the third switching circuit 30 may share the same switching control line, which may further reduce the number of transmission lines required by the light-emitting circuit.

In one embodiment, the first switching circuit 10 is a third transistor. The first electrode of the third transistor is electrically connected to the charging terminal. The second electrode of the third transistor is electrically connected to the first terminal of the first capacitor C1, the second electrode of the second transistor T2, the gate of the first transistor T1 and the gate of the second transistor T2. The gate of the third transistor is electrically connected to the switch control line. The second switching circuit 20 is the fourth transistor. The first electrode of the fourth transistor is electrically connected to the second terminal of the first capacitor C1. The second electrode of the fourth transistor is electrically connected to the first terminal of the current source 70. The gate of the fourth transistor is electrically connected to the switch control line. The third switching circuit 30 is the fifth transistor. The first electrode of the fifth transistor is electrically connected to the first electrode of the first transistor T1. The second electrode of the fifth transistor is electrically connected to the second electrode of the first transistor T1, and the gate of the fifth transistor is electrically connected to the switch control line.

In the present embodiment, the first switching circuit 10, the second switching circuit 20, and the third switching circuit 30 are thin-film transistors, which makes the light-emitting circuit is formed on the display panel more easily.

In another embodiment, a display panel comprises a plurality of light-emitting circuits as provided in at least one of the above embodiments.

The display panel provided by the above embodiments of the present disclosure includes the light-emitting circuit. The first switching circuit 10, the second switching circuit 20 and the third switching circuit 30 can synchronously turn on in the writing stage, which not only controls the current flowing through the first switching circuit 10 through the first capacitor C1, the second switching circuit 20 and the current source 70 to the third power line, and but also controls the current flowing through the third switching circuit 30, the second transistor T2 through the first capacitor C1, the second switching circuit 20 and the current source 70 flow to the third power line. Therefore, the current cannot flow to the light-emitting element 40 in the writing phase, reducing the power consumption without changing the potential transmitted by the first power line. By synchronously turning off the first switching circuit 10, the second switching circuit 20 and the third switching circuit 30 in the light-emitting stage, the current flowing through the first transistor T1 and the second transistor T2 can be controlled to the second power line through the light-emitting element 40. Since the current passes through the first transistor T1 and the second transistor T2, the current flowing through the light-emitting element 40 is reduced, improving the adverse effects of parasitic capacitance and wire resistance to the two transistors.

In the above embodiments, the description of each embodiment has its own emphasis, and the part not described in detail in one embodiment may be referred to the relevant description of other embodiments.

The above embodiments of the present disclosure provided by the light-emitting circuit and display panel are introduced in detail, the principle and embodiment of the present disclosure is elaborated in the present disclosure by specific examples. The description of the above embodiments is only used to help understand the technical solution of the present disclosure and its core idea. At the same time, for those skilled in the art, according to the idea of the present disclosure, there will be changes in the specific embodiment and the scope of application, in summary, the content of this specification should not be understood as a restriction on the present disclosure.

What is claimed is:
1. A light-emitting circuit, comprising:
a first transistor, having a first electrode electrically connected to a first power line, a gate, and a second electrode;
a second transistor, having a first electrode electrically connected to the second electrode of the first transistor, a gate, and a second electrode;

a light-emitting element, having a first terminal electrically connected to the second electrode of the second transistor, and a second terminal electrically connected to a second power line;

a first switching circuit, having a first terminal electrically connected to a charging terminal, and a second terminal electrically connected to the gate of the first transistor, the gate of the second transistor, and the second electrode of the second transistor;

a second switching circuit, having a first terminal and a second terminal;

a first capacitor, electrically connected between the second terminal of the first switching circuit and the first terminal of the second switching circuit;

a current source, electrically connected between the second terminal of the second switching circuit and a third power line; and a third switching circuit, having a first terminal electrically connected to the first electrode of the first transistor, and a second terminal electrically connected to the second electrode of the first transistor;

wherein the first switching circuit, the second switching circuit, and the third switching circuit are synchronously turned on or synchronously turned off.

2. The light-emitting circuit according to claim 1, wherein when the light-emitting circuit operates in a writing stage, the first switching circuit, the second switching circuit, and the third switching circuit are synchronously turned on to control a current flowing through the first switching circuit, the first capacitor, the second switching circuit, and the current source to the third power line, and to control current flowing through the third switching circuit, the second transistor, the first capacitor, the second switching circuit, and the current source flow to the third power line.

3. The light-emitting circuit according to claim 1, wherein when the light-emitting circuit operates in a light-emitting stage, the first switching circuit, the second switching circuit, and the third switching circuit are synchronously turned off to control current flowing through the first transistor and the second transistor to the second power line through the light-emitting element.

4. The light-emitting circuit according to claim 1, further comprising:
a first compensation circuit, electrically connected to the gate of the first transistor to reduce a threshold voltage drift of the first transistor; and
a second compensation circuit, electrically connected to the gate of the second transistor to reduce a threshold voltage drift of the second transistor.

5. The light-emitting circuit according to claim 1, wherein the charging terminal is used to transmit data signals, and the light-emitting element is an organic light-emitting diode, a micro light-emitting diode, a mini light-emitting diode or a quantum dot light-emitting diode.

6. The light-emitting circuit according to claim 1, wherein the first power line is used to transmit a positive power supply signal, the second power line is used to transmit a first negative power supply signal, the third power line is used to transmit a second negative power supply signal, and a potential of the second negative power supply signal is lower than a potential of the first negative power supply signal.

7. The light-emitting circuit according to claim 1, wherein the second power line and the third power line are the same power line.

8. The light-emitting circuit according to claim 1, further comprising a switch control line connected to a control terminal of the first switching circuit, a control terminal of the second switching circuit, and a control terminal of the third switching circuit.

9. The light-emitting circuit according to claim 8, wherein the first switching circuit is a third transistor, the second switching circuit is a fourth transistor, and the third switching circuit is a fifth transistor;

wherein a first electrode of the third transistor is electrically connected to the charging terminal, a second electrode of the third transistor is electrically connected to the first capacitor, the second electrode of the second transistor, the gate of the first transistor and the gate of the second transistor, and a gate of the third transistor is electrically connected to the switch control line;

wherein a first electrode of the fourth transistor is electrically connected to the second terminal of the first capacitor, a second electrode of the fourth transistor is electrically connected to the first terminal of the current source, and a gate of the fourth transistor is electrically connected to the switch control line;

wherein a first electrode of the fifth transistor is electrically connected to the first electrode of the first transistor, a second electrode of the fifth transistor is electrically connected to the second electrode of the first transistor, and a gate of the fifth transistor is electrically connected to the switch control line.

10. A display panel, comprising a light-emitting circuit, the light-emitting circuit comprising:
a first transistor, having a first electrode electrically connected to a first power line, a gate, and a second electrode;
a second transistor, having a first electrode electrically connected to the second electrode of the first transistor, a gate, and a second electrode;
a light-emitting element, having a first terminal electrically connected to the second electrode of the second transistor, and a second terminal electrically connected to a second power line;
a first switching circuit, having a first terminal electrically connected to a charging terminal, and a second terminal electrically connected to the gate of the first transistor, the gate of the second transistor, and the second electrode of the second transistor;
a second switching circuit, having a first terminal and a second terminal;
a first capacitor, electrically connected between the second terminal of the first switching circuit and the first terminal of the second switching circuit;
a current source, electrically connected between the second terminal of the second switching circuit and a third power line; and
a third switching circuit, having a first terminal electrically connected to the first electrode of the first transistor, and a second terminal electrically connected to the second electrode of the first transistor;
wherein the first switching circuit, the second switching circuit, and the third switching circuit are synchronously turned on or synchronously turned off.

11. The display panel according to claim 10, wherein when the light-emitting circuit operates in a writing stage, the first switching circuit, the second switching circuit, and the third switching circuit are synchronously turned on to control a current flowing through the first switching circuit, the first capacitor, the second switching circuit, and the current source to the third power line, and to control current flowing through the third switching circuit, the second transistor, the first capacitor, the second switching circuit, and the current source flow to the third power line.

12. The display panel according to claim 10, wherein when the light-emitting circuit operates in a light-emitting stage, the first switching circuit, the second switching circuit, and the third switching circuit are synchronously turned off to control current flowing through the first transistor and the second transistor to the second power line through the light-emitting element.

13. The display panel according to claim 10, wherein the light-emitting circuit further comprises:
    a first compensation circuit, electrically connected to the gate of the first transistor to reduce a threshold voltage drift of the first transistor; and
    a second compensation circuit, electrically connected to the gate of the second transistor to reduce a threshold voltage drift of the second transistor.

14. The display panel according to claim 10, wherein the charging terminal is used to transmit data signals, and the light-emitting element is an organic light-emitting diode, a micro light-emitting diode, a mini light-emitting diode or a quantum dot light-emitting diode.

15. The display panel according to claim 10, wherein the first power line is used to transmit a positive power supply signal, the second power line is used to transmit a first negative power supply signal, the third power line is used to transmit a second negative power supply signal, and a potential of the second negative power supply signal is lower than a potential of the first negative power supply signal.

16. The display panel according to claim 10, wherein the second power line and the third power line are the same power line.

17. The display panel according to claim 10, wherein the light-emitting circuit further comprises a switch control line connected to a control terminal of the first switching circuit, a control terminal of the second switching circuit, and a control terminal of the third switching circuit.

18. The display panel according to claim 17, wherein the first switching circuit is a third transistor, the second switching circuit is a fourth transistor, and the third switching circuit is a fifth transistor;
    wherein a first electrode of the third transistor is electrically connected to the charging terminal, a second electrode of the third transistor is electrically connected to the first capacitor, the second electrode of the second transistor, the gate of the first transistor and the gate of the second transistor, and a gate of the third transistor is electrically connected to the switch control line;
    wherein a first electrode of the fourth transistor is electrically connected to the second terminal of the first capacitor, a second electrode of the fourth transistor is electrically connected to the first terminal of the current source, and a gate of the fourth transistor is electrically connected to the switch control line;
    wherein a first electrode of the fifth transistor is electrically connected to the first electrode of the first transistor, a second electrode of the fifth transistor is electrically connected to the second electrode of the first transistor, and a gate of the fifth transistor is electrically connected to the switch control line.

\* \* \* \* \*